United States Patent Office 3,792,049
Patented Feb. 12, 1974

3,792,049
2-GUANIDINO-4,6-BIS-AMINO-S-TRIAZINES
Denis Varsanyi, Arlesheim, and Willy Roth, Aargau, Switzerland, assignors to Ciba-Geigy Corporation, Ardsley, N.Y.
No Drawing. Continuation-in-part of application Ser. No. 111,656, Feb. 1, 1971, which is a continuation-in-part of application Ser. No. 672,712, Oct. 4, 1967, both now abandoned. This application Feb. 17, 1971, Ser. No. 116,234
Claims priority, application Switzerland, Oct. 27, 1966, 15,589/66
Int. Cl. C07d 55/22
U.S. Cl. 260—249.6       8 Claims

ABSTRACT OF THE DISCLOSURE

Novel waxy, monobasic amines disubstituted at the amino nitrogen atom by a 2-guanidino-4-amino-s-triazinyl-(6) group and a 2,4-bis-amino-triazinyl-(6) group or by two 2-guanidino-4-amino-s-triazinyl-(6) groups, are described, in the molecule of which novel compounds the aforesaid guanidino substituent is of the formula

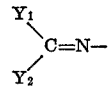

wherein each of $Y_1$ and $Y_2$ as well as each of the substituents in free positions at carbon atoms of the s-triazine nuclei are amino groups substituted by one or two organic radicals or are certain heterocyclic radicals, preferably at least one of the substituents of amino nitrogen atoms in the molecule being a long chain organic radical of at least 10 and up to 22 carbon atoms; the novel compounds have wax-like properties and are useful as components in novel floor care agents, especially in combination with conventional ingredients in compositions for the treatment of floor surfaces, such as natural and synthetic waxes, resins, silicones, inorganic and organic fillers, detergents and other surfactants, pigments, stabilizing agents and the like conventional adjuvants; the aforesaid novel s-triazine derivatives afford to the treated surfaces, among other advantages, high gloss and/or satisfactory antislip effects. They are also useful as waxy components in automobile polishes and in copying layers on carbon paper.

CROSS-REFERENCE TO RELATED APPLICATIONS

This application is a continuation-in-part of our application Ser. No. 111,656, filed Feb. 1, 1971, which in turn is a continuation of application Ser. No. 672,712, filed Oct. 4, 1967, both now abandoned.

DESCRIPTION OF THE INVENTION

The present invention relates to certain novel 2-guanidino-4,6-bis-amino-s-triazine derivatives and to floor care agents containing them as wax-like components which serve particularly to impart high gloss and antislip effects to floor surfaces treated therewith.

By the term "floor care agent" as used in the following description of the invention, there are meant compositions which are useful for the treatment of floor surfaces of all types to clean the same and impart to them gloss and, preferably at the same time, an antislip effect. Such surfaces can be those of inorganic materials such as stone or tile, or they can be surfaces of organic materials such as wood, and synthetic plastics, e.g. linoleum; textile fiber materials and paper can also be treated with the agents according to the invention and similar beneficial results are obtained.

We have found that certain monobasic amines which are disubstituted at the amino nitrogen atom by a 2-guanidino-4-amino-s-triazinyl-(6) and a 2,4-bis-amino-s-triazinyl-(6) group or by two 2-guanidino-4-amino-s-triazinyl-(6) groups, have waxy properties and therefore are valuable as wax components of floor care agents as described above.

More in particular, the novel amines are of the formula

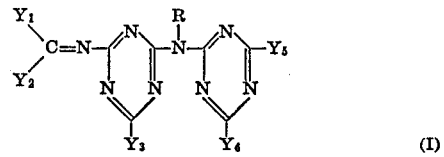

wherein each of $Y_1$, $Y_2$, $Y_3$ and $Y_4$ represents an amino group selected from
 (a) A group —NH—$R_1$ wherein $R_1$ represents alkyl, hydroxy-alkyl or alkenyl of from 6 to 22 carbon atoms;
 (b) A group

wherein
$R_1$ represents alkyl of from 6 to 22 carbon atoms, alkenyl of from 6 to 22 carbon atoms, hyroxy-alkyl of from 2 to 18 carbon atoms, alkyl of at most 18 carbon atoms substituted by —COO⁻M+ or by

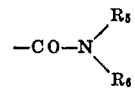

wherein each of $R_5$ and $R_6$ represents
 hydrogen,
 lower alkyl or hydroxy-lower alkyl,
 alkenyl of 3 to 18 carobn atoms substituted by —COO⁻M+,
 halogeno-alkyl of from 2 to 18 carbon atoms wherein the halogeno substituent has an atomic number of at most 35, morpholino-lower alkyl,
 monocyclic cycloalkyl of from 3 to 12 carbon atoms, bicyclic cycloalkyl, or
 tricyclic cycloalkyl, each of which two last-mentioned groups has from 5 to 12 carbon atoms, and
M+ represents one equivalent weight of a cation, hydrogen or alkali metal ion being preferred, and
$R_2$ represents alkyl or alkenyl of hydroxyalkyl of at most 6 carbon atoms, or (c) A heterocyclic radical of from 5 to 7 ring members, one of which ring members is a nitrogen atom which is linked directly to the carbon atom of the —C=N-group or, in the case of $Y_3$ and $Y_4$, to a carbon atom of the respective triazine ring, while a second ring member of said heterocyclic radical is selected from carbon, nitrogen, oxygen and sulfur, any substituent of said heterocyclic radical being selected from lower alkyl and halogeno-lower alkyl,
$Y_5$ represents the group

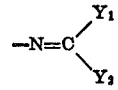

wherein $Y_1$ and $Y_2$ have the meanings given above, or it represents an amino-group as defined under (a), (b) or (c) supra, and
R represents hydrogen, lower alkyl or lower alkenyl.

Suitable saturated nitrogen heterocyclic radicals bound by way of a ring nitrogen atom to the s-triazine nucleus are pyrrolidino, piperidino, piperazino, 4 - lower alkyl-piperazino, morpholino, thiomorpholino, as well as hexahydro-azepino and hexahydro-diazepino groups.

2-guanidino-4,6-bis-amino-s-triazines can be produced by the process described in U.S. Pat. No. 3,053,843, by exchanging the four halogen atoms of the tetrameric cyanogen halide for the corresponding radicals of primary or secondary amines or heterocyclic bases which have at least one NH-group as ring member, the exchange being made in the presence of an acid binding agent and a solvent.

The new amines of general Formula I are obtained according to the invention by reacting a 2-guanidino-4,6-bis-amino triazine obtained as described above and being of the formual

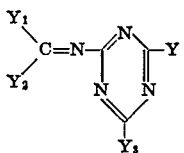

(II)

with a triazine of the formula

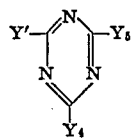

(III)

wherein the symbols $Y_1$ to $Y_5$ have the meanings given above and one of the two symbols Y and Y' represents a halogen atom up to the atomic number 35 and the other represents the amino group or, preferably, the radical of a primary or secondary aliphatic amine, the reaction being performed in the presence of an acid binding agent and, if desired, in the presence of a solvent or diluent and an inert gas, at temperatures between 100 and 300° C.

Chloro-s-triazines are particularly suited for the process according to the invention as halogenated starting materials of Formula II or III; of the amino-s-triazines of Formula II or III those are preferred wherein Y or Y' represents the radical of a primary amine. S-triazines substituted by dialkylamino groups, which can be used as starting materials for the reaction, should contain at least one alkyl radical bearing 1 to 3 carbon atoms. The condensation of the s-triazine derivatives of Formulas II and III proceeds with splitting off of hydrogen halide when amino- and alkylamino-triazines are used as one of the starting materials, and with splitting off of an alkane chloride when dialkylamino-triazines are used. The reaction is performed advantageously while excluding air in an inert gas atmosphere, e.g. under an atmosphere of nitrogen.

As solvents or diluents, particularly higher boiling organic solvents the boiling point of which is higher than 100° are used, e.g. aliphatic and aromatic hydrocarbons such as higher boiling petroleum fractions, toluene, xylenes; halogenated hydrocarbons such as chlorobenzene; higher boiling ethers, N-alkylated acid amides, sulphoxides, etc.

Suitable acid binding agents according to the invention are both inorganic bases such as carbonates and hydroxides of alkali and alkaline earth metals as well as organic bases such as tertiary amines, e.g. pyridine and collidine. In some cases it is preferable to use, as solvent or diluent, a tertiary amine such as pyridine, which, in addition to the function of a solvent also has that of an acid binding agent.

Particularly preferred for use in floor care agents are those amines of Formula I which fall under the formula

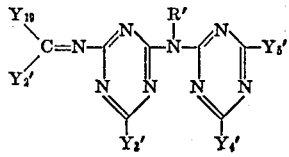

(IV)

wherein each of $Y_1'$, $Y_2'$, $Y_3'$ and $Y_4'$, independently from the others, represents (a) An amino group of the formula —$NHR_1'$ wherein $R_1'$ represents alkyl of from 6 to 22 carbon atoms or alkenyl of from 6 to 22 carbon atoms;

(b) An amino group of the formula

wherein $R_1'$ has the aforesaid meaning and $R_2'$ represents alkyl of at most 6 carbon atoms or alkenyl of at most 6 carbon atoms, and those groups $R_1'$ and $R_2'$ occurring under (a) and (b) supra, which represent alkyl or alkenyl groups of the numbers of carbon atoms as defined, which bear substituents selected from hydroxy and halogen of an atomic weight of at most 35; or (c) A heterocyclic radical of 5 to 6 ring members, one of which is a nitrogen atom which is linked to the carbon atom of the grouping —C=N—, or which in the case of $R_3'$ and $R_4'$ and $R_5'$ when the latter represents amino groups, is linked directly to a ring carbon atom of the respective adjacent s-triazine ring; a second one of said ring members being selected from carbon, nitrogen, oxygen and sulfur, any substituent of said heterocyclic radical being selected from lower alkyl and halogeno-lower alkyl $Y_5'$ has one of the meanings as defined under (a), (b) and (c) supra, or it represents the grouping

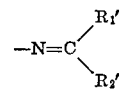

wherein $R_1'$ and $R_2'$ have the meanings given hereinbefore, and $R_6$ represents hydrogen or alkyl of from 1 to 4 carbon atoms.

"Lower" used in connection with an aliphatic radical means that such radical has at most 5 carbon atoms unless expressly stated otherwise.

The new amines of Formula I have practically all characteristic melting ranges and have wax-like properties; they can be used, therefore, instead of or together with the usual commercial natural and synthetic waxes for the treatment and protection of surfaces of all types. They have the characteristic properties of natural waxes such as solubility in solvents for fat, miscibility with natural and synthetic waxes and, with the addition of suitable emulsifying agents, they can be worked up in water into finely dispersed emulsions. The new compounds produce coatings which are resistant to chemicals, in particular they have good alkali resistance. In their excellent suitability as waxes, the preferred ones are similar to the montanic acid esters.

The metal and ammonium salts, the addition salts of inorganic and organic acids and the quaternary ammonium salts of the compounds of Formula I have similar properties and can be used instead of or together with natural waxes for the above-described purposes.

The production of these salts from the compounds of Formula I is carried out by well-known methods which have been described, for instance, in British Pat. No. 922,830, Swiss Pat. No. 404,335, and Belgian Pat. No. 620,374.

Floor care agents according to the invention are obtained by mixing a guanidino-s-triazine derivative of Formula I or several such derivatives with substances which are suitable for the treatment of floor surfaces, and comprise, as important components, adjuvants compatible with the said triazine derivatives and which are admixed with the latter in sufficient amount for permitting uniform distribution of said agents on surfaces to be treated therewith. Such substances are, for example, (a) body-giving adjuvants such as natural and synthetic waxes, resins, silicones, etc. which improve the physical properties, as well as inorganic and organic fillers, e.g. silicates, milled plastics; (b) solvents; (c) anionic, cationic or non-ionic solids-dispersing and emulsifying agents; (d) detergents such as natural and synthetic wetting agents, e.g. soaps; (e) pigments; (f) agents to improve the stability to light; (g) stabilizers of all types such as corrosion inhibitors; and (h) miscellaneous other adjuvants, such as scents, dyestuffs biocidal active substances or agents containing such substances, e.g. insecticides, fungicides, bactericides, etc.

The content of compounds of Formula I in such agents ranges from 0.2 to preferably not more than about 50% of the total weight of the agent. Preferred compositions according to the invention contain about 1 to 40%, of their total weight, of a compound of Formula IV.

The compounds of Formula I, and the above-mentioned salts thereof, can be used in these agents instead of natural waxes or together therewith for the treatment and protection of such surfaces, as for example, surfaces of inorganic materials, e.g. metal surfaces such as chromed metal parts, polished stone, ceramic tiles, automobile bodies, but also as gloss-imparting and surface-protecting agents applied on surfaces of organic materials, e.g. wood, leather, plastic resinous material such as linoleum, etc., on textiles as hydrophilic agents, and on paper as carriers for copying layers. Surfaces treated therewith can be given a high gloss by polishing lightly.

The surface treating agents according to the invention can be used in the form of and be used as aerosols, solutions, emulsions, semi-solid and solid pastes. The agent can thus serve especially as floor care compositions which render floors of all kinds of material smooth and glossy, while preferably having an anti-slip effect. Floors to which the agents according to the invention have been applied, show a fine gloss, many of the novel s-triazine derivatives being self-polishing, or the gloss of such treated floors and the like surfaces can be enhanced by subsequent rubbing with a soft cloth or the like well-known techniques. Floor care agents according to the invention can be applied to unsealed as well as to sealed floors.

Such floor-care compositions contain as essential ingredients the above mentioned about 0.2% to 50% by weight of an amine of Formula I given hereinbefore, and in preferred compositions from about 1 to 40%, an amine of Formula IV, as well as an adjuvant compatible with said amine and selected from:

(i) a solid macromolecular compound which is film-forming by about 1 to 5% of its weight of a plasticizer, and which has at 20° C. a Tukon hardness of at most 10,
(ii) a hard resin which has a 20° C. a Tukon hardness about 10, and such component (a) or (b) plasticized with a plasticizer selected from a liquid organic compound which has, at 20° C. a viscosity ranging from 52–100.000, a melting point below 15° C., and a solid plasticizer having a penetration index between 1 and 80 at 20° C., and a melting point above 40° C.,
(iii) a cationic emulsifying agent,
(iv) a non-ionic emulsifying agent, and
(v) mixtures of at least two of said components (i) through (iv).

These compositions can be diluted with conventional admixtures of solvents and, optionally, also co-solvents.

More in particular, three classes of floor care agents can be produced with guanidino-s-triazines of Formula I as a waxy component. These are, firstly, polishing waxes, i.e. agents that are applied with a certain solvent content which evaporates, leaving a coating on the treated surfaces that must subsequently be polished, e.g. with a cloth or a suitable polishing apparatus, and secondly, sealing agents for wooden floors, especially for parquet floors. The content of guanidino-s-triazines of Formula I in these classes of agents should be from about 1 to 25% calculated on the weight of the solids content of the agent, the balance of the latter consisting of a hardwax, preferably a paraffin wax or a microwax, e.g. tankbottom wax, isoparaffin, ceresin, ozokerite, wax substitutes or synthetics of the types described below.

As evaporable solvents for the wax and the triazine components petroleum fractions, e.g. white spirits, have been found to be particularly economic. The solvent should be capable of dissolving the solids readily at temperatures of 60 to 80° C.

Synthetic wax substitutes which are particularly suitable for use in the above described classes of floor care agents are (A)

Solid macromolecular compounds which are film-forming by themselves or by admixture with from about 1 to 5% of a plasticizer, and which have at 20° C. a Tukon hardness (ASTM D–1474–62 T) of at most 10 and, when plasticized with dibutyl phthalate in a weight ratio of 3:1, a Sward hardness of at least 2, and preferably between 5 and 40; such compounds pertaining to the following:

(A1) Organic esters of cellulose, obtained by partial esterification of the hydroxyl groups of cellulose by organic monocarboxylic acids or mixtures of such acids, preferably the acetate, acetobutyrate and propionate esters.

The viscosity of these organic esters of cellulose can vary from 0.1 to 200 poises (ASTM D–1343–54 T method, carried out on a solution prepared according to Formula A of the ASTM D–871–54 T method), but the esters of viscosity 0.1 to 10 poises are preferred. Preferred cellulose esters are those of alkanoic and alkenoic acids having at most 5 carbon atoms.

(A2) Cellulose nitrates.

(A3) Cellulose ethers (alkylcelluloses and carboxalkyl-celluloses); preferred are those ethers of alkyl and/or hydroxy-alkyl groups having lower molecular weight.

(A4) Polyvinyl ketals, in particular polyvinyl acetals. Their content of

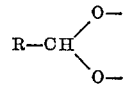

groups can vary from 65 to 85%, but those which contain 72 to 80% are preferred; the content of R–COO groups can vary from about 1 to 2%, but acetals containing about 2% thereof are preferred, the content of free OH groups can vary from 10 to 30%, with the range of 17–22% being preferred. R represents lower alkyl ($C_1$ to $C_4$).

The "Höppler" viscosities of these ketals can be: 2 to 115 centipoises, with the range of 2–5 cp. being preferred, for 6% strength solutions in methanol at 20° C., 5 to 125 cp., and preferably 5–10 cp., for 5% strength solutions in 85% strength ethyl alcohol at 25° C., and 10 to 300 cp., and preferably 10–20 cp., for 5% strength solutions in butanol at 20° C.

Other suitable compounds of this class are the polyvinyl butyrals produced by the reaction of butyraldehyde with polyvinyl alcohols, in which the percentage by weight of polyvinyl alcohol groups in the molecule can vary from 10 to 25%, and preferably from 17 to 21%.

The viscosity of a 5% strength solution of polyvinyl butyral in 95% strength ethyl alcohol at 20° C. can vary from 5 to 110 centipoises, preferably from 5 to 15 centipoises.

The designation "polyvinyl" is intended to indicate that the product has resulted from the condensation of a vinyl monomer. The polyvinyl chains have a 1,3-glycol structure corresponding to the following formula:

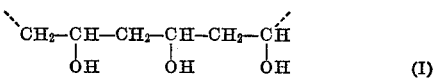

(A5) Phenoplastics, preferably the phenoplastics which have been modified by incorporating higher fatty acids and/or polyesters of dicarboxylic acids, and which have a viscosity which can vary from 8 to 40 poises at 20° C. (for a 60% strength solution in butanol, Höppler method), and preferably a viscosity of between 10 and 15 poises.

(A6) Aminoplastics which have been modified preferably by condensation with polyesters of aliphatic polycarboxylic acids and of polyalcohols, and/or by any other type of internal plasticization. The flow time of a 60% strength solution of modified aminoplastic in butanol, at 20° C., in the DIN 4 cup, can vary from 150 to 800 seconds, but modified aminoplastics which under these conditions give flow times of 550 to 650 seconds are preferred.

(A7) Polyurethanes, especially urethane oils obtained by combination of diisocyanates with unsaturated vegetable oils (for example linseed oil), in which the oil content can vary from 55 to 75%; preferably urethane oils in which the oil content is about 65%.

Other wax substitutes suitable for use in the second aforesaid class of floor care agents, i.e. sealing agents, are (B)

Hard resins which are preferably insoluble in hydrocarbon solvents and have at 20° C. a Tukon hardness above 10, and plasticized with dibutyl phthalate in a weight ratio of 3:1, a Sward hardness above 50, and preferably between 50 and 80, said resin being preferably compatible with compound (A), supra, and with constituents (D) and (E), described infra; suitable hard resins being in particular, (B1) Resins originating from the condensation of melamine (2,4,5-triamino-triazine) with formaldehyde.

(B2) Resinous condensation products of urea and formaldehyde, so-called urea-formaldehyde resins, preferably in unmodified form.

(B3) Styrene resins, and principally the condensation resins of styrene with an ester of maleic acid and optionally an organic compound possessing at least two hydroxyl groups.

(B4) Solid silicone resins, corresponding to the general three-dimensional structure

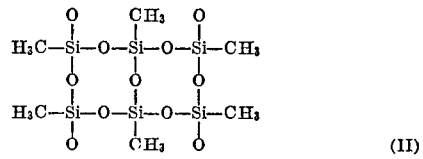

(II)

Such synthetic wax substitutes can also be used in the form of mixtures of those types enumerated above under (A) and (B), and they can also be used with an admixture, of up to 40% of the weight of the wax substitute component, of a liquid or solid plasticizer or a mixture of solid and liquid plasticizer as described further below.

A third class of such floor care agents comprises aqueous emulsions as described further above. In these emulsions the content of guanidino-s-triazine according to the invention amounts to about 1 to 35% of the weight of the non-aqueous portion of the agent, which latter portion consists essentially of the waxy components, namely the guanidino-s-triazine component and a wax, a wax substitute or a hard resin component, and of a suitable emulsifying agent and, preferably, of a plasticizer for the hard resin.

Waxes particularly suitable for this class of floor care agents are emulsifiable waxes such as non-tacky natural waxes, e.g. Carnauba wax, and montainic acid ester waxes.

Wax substitutes and hard resin components falling under the classes of (A) and (B) defined hereinbefore and which are particularly suitable for use in such floor care emulsions containing guanidino-s-triazines are the following:

(A8) Acrylic polymers, preferably polyesters of acrylic and methacrylic acids with lower alkanols.

Poly(isobutyl methacrylates), poly(n-butyl methacrylates) and isobutyl/n-butyl copolymers are preferred.

The Tukon hardness of the acrylic polymers can vary from 1 to 10 and is preferably from 4 to 10.

(A9) Resin acids, and preferably polymers originating from oleo-resins secreted by conifers (molecular weight above 300), such as colophony.

(B5) Aldehyde/ketone resins (for example, Ketone resin A, sold by the German company Badische Anilin und Soda Fabrik of Ludwigshafen, or Ketone resin SK, sold by the German company Chemische Werke Huls, of Marl, both in Germany).

(B6) Esters of polyacrylic acid and lower alkanols (lower polyacrylic resins).

Polyacrylic resins of which the Tukon hardness is greater than 10, and which are obtained by polymerization of methyl acrylate, methyl methacrylate, ethyl methacrylate, n-butyl methacrylate or isobutyl methacrylate, or by copolymerization of n-butyl methacrylate and isobutyl methacrylate, methyl methacrylate and n-butyl methacrylate, methyl methacrylate and isobutyl methacrylate, ethyl methacrylate and n-butyl methacrylate, or ethyl methacrylate and isobutyl methacrylate, will be preferred, though of course this list of preferred polyacrylics is not intended to be limiting.

(B7) Esters of monomeric resin acids, preferably the esters of resin acids from colophony which possess at least one carboxyl group, and of organic compounds possessing at least one hydroxyl group such as, preferably, the lower alkanols and aromatic alcohols such as phenol, and also fumaric acid.

(B8) Esters of organic non-resinous polycarboxylic acids, and of monomeric polyhydric alcohols, such as phthalic resins.

(B9) Products originating from the polycondensation of phenolic compounds with formaldehyde, which are unmodified.

Plasticizers that can be used with the wax, wax substitute or resin components of the aforesaid three classes of floor care agents are preferably:

(C)

Liquid plasticizers which have, at 20° C., a viscosity ranging from 50 to 100,000 centipoises, an acid number of at most 10, a refraction index from 1.350 to 1.550 at 20° C., a melting point below 15° C. and a weight loss due to evaporation in 2 hours and at a temperature of 20° C. which is below 0.1 gram.

(D)

Solid plasticizers which are compatible or miscible with platsicizer (C) and have a penetration index between 1 and 80 at 20° C., a melting point above 40° C., and a weight loss due to evaporation in 2 hours and at a temperature of 20° C. which is below 0.1 gram;

The contents of constituent (D) being at most 20% of the total weight of constituents (A), (B), (C) and (D) taken together.

The liquid plasticizers (C) are preferably chosen from amongst the liquid organic compounds having a viscosity, at 20° C., ranging from 50 to 100,000 centipoises and which is preferably between 200 cp. and 30,000 cp., and a melting point below 15° C. Their volatility on being heated at 100° C. for 100 hours can be from 1 to 2.5% by weight. Their vapor pressure is preferably less than 0.001 torr at 20° C.

The liquid plasticizers which conform to the above mentioned conditions are especially chosen from the following groups:

(D1) Esters of resin acids, preferably of the resin acids of colophony, and of aliphatic alcohols containing preferably from one to two hydroxyl groups per molecule and being free from ether groups (C—O—C bridges).

(D2) Esters of resin acids, and preferably of the resin acids of colophony, and of ethers of polyalcohols, having preferably from 2 to 3 hydroxyl groups of which one is etherified by lower alkyl. Preferred are particularly the soft resins obtained from resinic acids and diethylene glycol.

(D3) Esters of monocarboxylic aliphatic non-resinic acids and of aliphatic monomeric alcohols having from 1 to 12 hydroxyl groups. Preferred are the acetobutyrates and acetoisobutyrates of sucrose and the oleates of alkanols having from 8 to 16 carbon atoms.

(D4) Esters of polycarboxylic aliphatic acids and of aliphatic, preferably monohydric alcohols.

(D5) Esters of cyclic polycarboxylic non-resinic acids and of aliphatic, preferably monohydric alcohols, and preferably the phthalates of aliphatic alcohols having at most 20 carbon atoms.

(D6) Esters of cyclic polycarboxylic non-resinic acids and of cyclic hydroxyl compounds, and preferably the phthalates of cycloaliphatic alcohols of 5 to 6 ring carbon atoms and those of phenols.

(D7) Unsaturated fatty alcohols having from 12 to 20 carbon atoms.

(D8) Esters of ortho-phosphoric acid and of aliphatic, cycloaliphatic and aromatic alcohols.

(D9) Polypropylene-glycols of a molecular weight of from about 2,000 to 4,000, the solubility of which in water is less than 0.1 g. in 100 g. of water at 25° C., for example the polyglycol "P 2000" and the polyglycol "P 4000" sold by Dow Chemical Company of Midland, Mich., U.S.A.

(D10) Monoglycerides, diglycerides and triglycerides of organic carboxylic non-resinic acids having at least 4 carbon atoms, and preferably of those, which are unsaturated and have from 10 to 20 carbon atoms.

(D11) Non-drying alkyd resins which are unmodified with acids of the fatty series, and are soft and viscous (viscosity: about 50 to 200 cp. at 20° C. when diluted in a weight ratio of 1:1 with butyl acetate).

(D12) Non-drying alkyd resins modified with saturated or unsaturated fatty acids.

(D13) Liquid chlorinated diphenyls, the chlorine content of which ranges from 41 to 61% by weight.

(D14) Soft polycarbamate resins (for example Uresin B, sold by Hoechst AG, Frankfurt-am-Main, Germany).

(D15) Liquid triazines of the formula

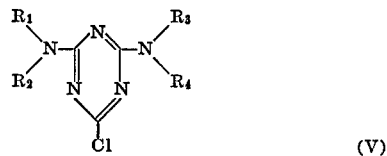

wherein each of $R_1$ and $R_3$, independently of the other, represents a hydrogen atom or a saturated and preferably aliphatic hydrocarbon radical having from one to 18 carbon atoms or a monocyclic aralkyl group in which the alkyl portion has at most 4 carbon atoms, or each of the pairs $R_1/R_2$ and $R_3/R_4$ taken together with the respective nitrogen atom to which it is linked, represents a group selected from pyrrolidine, piperazino, each of $R_1$ and $R_3$ preferably represents a hydrogen atom or an alkyl group of from 1 to 4 carbon atoms while each of $R_2$ and $R_2$ preferably represents an alkyl group of from 1 to 4 carbon atoms.

The solid plasticizers (D) are either crystalline or waxy, and are preferably miscible or compatible with the liquid plasticizer (C) and have a melting point above 40° C. and a penetration index between 1 and 80 at 20° C., as determined with a penetrometar, and preferably a penetration number of 4 to 25, their weight loss due to evaporation in 2 hours and at 20° C. being less than 0.1 gram. These solid plasticizers are particularly chosen from amongst the products belonging to one of the following classes:

(E1) Esters of saturated organic monocarboxylic acids having 8 to 11 carbon atoms, and of monohydric alcohols having from 8 to 12 carbon atoms.

(E2) Esters of aliphatic monocarboxylic non-resinous acids having from 8 to 24, and preferably from 10 to 20 carbon atoms, and monomeric polyhydric alcohols having at least 2 carbon atoms, and preferably from 2 to 12 hydroxyl groups; the alcohol moieties of these esters are preferably aliphatic.

(E3) Aliphatic saturated monocarboxylic acids having at least 12 and preferably not more than 24 carbon atoms.

(E4) Aliphatic dicarboxylic acids having from 6 to 12 carbon atoms.

(E5) Fatty alcohol having from 12 to 22 carbon atoms and especially the fatty alcohols of which the hydrocarbon chain is saturated; within this group, tetradecyl or myristyl alcohols (C 14) and hexadecyl or cetyl alcohols (C 16) are preferred.

(E6) Amines of the types

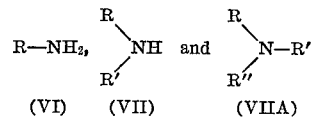

wherein R, R' and R'', which may be identical or different, represent aliphatic hydrocarbon radicals containing from 7 to 24 carbon atoms.

(E7) Esters of acids of the fatty series with at least 10 carbon atoms, preferably 12 to 24 carbon atoms, and of polyvinyl alcohols; the viscosity of these esters when hot, measured in accordance with the Ubbelohde method, is between about 300 and 500 cst. at 70° C., and between about 100 and 300 cst. at 100° C.; these esters must have an acid number less than 1 and a saponification number of zero, and the content of unsaponifiable matter must hence be 100%.

(E8) Natural and synthetic lecithins.

(E9) Polyethyleneglycols resulting from the polycondensation of ethylene oxide, and corresponding to the general formula:

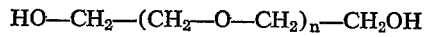

wherein $n$ is greater than 3 and preferably between 4 and about 700.

(E10) Monomeric polyhydric alcohols, having an uninterrupted linear or branched aliphatic, or alicyclic-aliphatic, or alicyclic chain, and preferably from 2 to 6 hydroxy groups, which alcohols have a melting point of at least 40° C. and preferably above 50° C.

2.2-dihydroxymethyl-butan - 1 - ol and trimethylolpropane, having a melting point of 58° C. are examples of such alcohols.

(E11) Diesters of carboxylic dicarboxylic acids having at least 7 carbon atoms and of cyclic or alicyclic-aliphatic monohydric alcohols, of which the melting point is preferably above 50° C. Dicyclohexyl phthalate, having a melting point of 64° C., is an example of these diesters.

(E12) Diesters of carbocyclic dicarboxylic acids having at least 7 carbon atoms and of monohydric aliphatic alcohols having at least 8 carbon atoms.

Emulsifying agents are used as dispersing and emulsion stabilizing components in the floor care agents according to the invention pertaining to the above-mentioned third class. They are used in amounts of from about 0.01 to 5%, but preferably not exceeding about 2% of the non-aqueous portion of the emulsion.

This invention is not limited in its broad aspects to any particular emulsifying agent. Such agents are described, for instance in "A list of commercially available detergents, wetting, dispersing and emulsifying agents." by H. L. Cupples. Division of Insecticide Investigations of the United States Department of Agriculture, published June 1940, and in chapter 11 on "Emulsions" of Mattiello's "Protective and Decorative Coatings," vol. IV, John Wiley & Sons, Inc., New York, 1944. Nor is the invention in its broad aspects limited to agents of either the ionic or non-ionic type, though the use of those of the non-ionic type is preferred.

Sulphonated vegetable oils (e.g. sulphonated castor oil, corn oil, peanut oil, soy bean oil etc.) are examples of ionic agents that may be used. When such agents are used, it is advisable to use soft water for dilution purposes. Emulsifying agents of the non-ionic type are preferred. This type of agent will usually dissolve or suspend from 1 to 50% of its volume or weight of the solid components described therebefore, and the emulsion may then be diluted with water to the desired concentration for application to a floor surface.

A class of non-ionic agents that we have found particularly suitable for the purposes of this invention consists of water-soluble, non-ionic emulsifying agents containing polyether groups of the formula $$R.O.(C_2H_4O)n.R_1$$

wherein R is an alkyl, aryl, aralkyl, alkyl-aryl, alkyl-aryl or acyl group of 10 to about 20 carbon atoms and $R_1$ is an alkyl, aryl, aralkyl, alkyl-aryl, or acyl group or a hydrogen atom, and $n$ is an integer greater than 2 and preferably from 1 to 30, but may be up to 100.

Commercial products answering to the foregoing description, which have been used in practicing the invention, are those made by Atlas Chemical Industry, Wilmington, Del. and sold under the trademarks Tween and Atlox and those made by Rohm and Haas Co, Philadelphia, Pa. and sold under the name of Triton X100. Tween is a polyoxyalkylene derivative of sorbitan monolaurate, and Triton X100 noctylphenol polyethylene glycol having 9–10 ethylene oxide groups per mole of oxyphenol.

Other non-ionic commercial products are Igepal CA630, of similar chemical composition, Emulat P140 which is a mixture of alkylarylpolyglycolether similar to the last mentioned products and alkylarylsulfonate, Genapol O-100 which is an oleylalcohol polyglycolether of a molar ratio of oleyl alcohol to ethylene oxide of about 1:10, Surfynol 104 which is 3,5-dimethyl-1-hexen-3-ol, Tetronic 304 which is a product of the successive addition of propylene oxide and ethylene oxide to one mole of ethylene diamine, which products has a mean molecular weight of about 750, Sapogenat T100 which is a tributylphenol polyglycol ether having a density of 1.029 g./cm.$^3$ and a viscosity at 50° C. of 69.9 centipoises, Genapol C-080 which is the polyglycol ether obtained from 8 moles of ethylene oxide per mole of coconut oil fatty alcohol, 3-amino-2-methyl-propanol, and the polyethylene glycols of molecular weight of 1500 or more, marketed under the trade name Carbowax.

The following non-limitative examples describe the production of the new amines, and the production and composition of surface treating agents according to the invention. Where not otherwise stated, parts and percentages are given therein by weight and the temperatures are in degrees centigrade.

EXAMPLE 1

945 parts of 2-(1',3'-di-n-octadecyl-guanidino)-4-n-octadecylamino-6-chloro-s-triazine and 659 parts of 2-ethyl-amino-4,6-bis-n-octadecylamino-s-triazine are dissolved by stirring into 5000 parts by volume of anhydrous pyridine while heating. The reaction solution is then refluxed for 18 hours under an atmosphere of nitrogen. It is filtered hot, the filtrate is evaporated to dryness in vacuo and the residue is thoroughly washed with water and dried in vacuo. [2-((1',3'-di-n-octadecyl-guanidino)-4-n-octadecylamino-s-triazinyl-(6)]-[2'',4''-bis-n-octadecylamino-s-triazinyl-(6'')]-ethylamine, is obtained which, after recrystallization from acetone, melts at 58–60°.

The production of the starting triazine is described in our patent application Ser. No. 672,733, filed on Oct. 4, 1967.

EXAMPLE 2

N,N - bis-[2-(1',3'-di-n-octadecyl-guanidino)-4-n-octadecyl-amino-s-triazinyl-(6)]-ethylamine, M.P. 76–78°, is obtained by the method described in Example 1 on using 945 parts of 2-(1',3'-di-n-octadecyl-guanidino)-4-n-octadecylamino-6-chloro-s-triazine, 954 parts of 6-ethylamino-2 - (1',3'-di-n-octadecyl-guanidino)-4-n-octadecylamino-s-triazine in the presence of 214 parts of collidine.

Further amines falling under Formula I the substituents $Y_1$ through $Y_5$ and R are given in the respective columns of the following tables are produced in the way described in the preceding examples on using correspondingly substituted starting materials of Formulas II and III.

TABLE I

| Example No. | $Y_1$ | $Y_2$ | $Y_3$ | $Y_4$ | $Y_5$ | R |
|---|---|---|---|---|---|---|
| 3 | -NH-n-C$_{18}$H$_{37}$ | -NH-n-C$_{18}$H$_{37}$ | -NH-n-C$_{18}$H$_{37}$ | -NH-n-C$_{18}$H$_{37}$ | N(C$_2$H$_4$OH)$_2$ | -CH$_3$ |
| 4 | | | | | | |
| 5 | -NH-n-C$_{18}$H$_{37}$ | -NH-n-C$_{18}$H$_{37}$ | -NH-n-C$_{18}$H$_{37}$ | -NH-n-C$_{18}$H$_{37}$ | 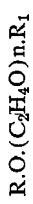 | -CH$_3$ |
| 6 | -NH-n-C$_{18}$H$_{37}$ | -NH-n-C$_{18}$H$_{37}$ | -NH-n-C$_{18}$H$_{37}$ | -NH-n-C$_{18}$H$_{37}$ | pyrrolidinyl | -CH$_3$ |
| 7 | -NH-n-C$_{18}$H$_{37}$ | -NH-n-C$_{18}$H$_{37}$ | -NH-n-C$_{18}$H$_{37}$ | -NH-n-C$_{18}$H$_{37}$ | piperidinyl | -CH$_3$ |
| 8 | -NH-n-C$_{18}$H$_{37}$ | -NH-n-C$_{18}$H$_{37}$ | -NH-n-C$_{18}$H$_{37}$ | -NH-n-C$_{18}$H$_{37}$ | morpholinyl | -C$_2$H$_5$ |
| 9 | -NH-n-C$_{18}$H$_{37}$ | -NH-n-C$_{18}$H$_{37}$ | -NH-n-C$_{18}$H$_{37}$ | -NH-n-C$_{18}$H$_{37}$ | N-methylpiperazinyl | -C$_2$H$_5$ |
| 10 | | | | | | |

TABLE I—Continued

| Example No. | Y₁ | Y₂ | Y₃ | Y₄ | Y₅ | R |
|---|---|---|---|---|---|---|
| 11 | CH₃—N—C₁₈H₃₇ | CH₃—N—C₁₈H₃₇ | CH₃—N—C₁₈H₃₇ | CH₃—N—C₁₈H₃₇ | —N(C₂H₄OH)₂ | —C₂H₄ |
| 12 | | | | | | |
| 13 | CH₃—N—C₁₈H₃₇ | CH₃—N—C₁₈H₃₇ | CH₃—N—C₁₈H₃₇ | CH₃—N—C₁₈H₃₇ | —HN(CH₂)₁₀COONa | —C₃H₇ |
| 14 | CH₃—N—C₁₈H₃₇ | CH₃—N—C₁₈H₃₇ | CH₃—N—C₁₈H₃₇ | CH₃—N—C₁₈H₃₇ | pyrrolidinyl | —C₃H₇ |
| 15 | CH₃—N—C₁₈H₃₇ | CH₃—N—C₁₈H₃₇ | CH₃—N—C₁₈H₃₇ | CH₃—N—C₁₈H₃₇ | morpholinyl | —C₃H₇ |
| 16 | CH₃—N—C₁₈H₃₇ | CH₃—N—C₁₈H₃₇ | CH₃—N—C₁₈H₃₇ | CH₃—N—C₁₈H₃₇ | N-methylpiperazinyl | —C₃H₇ |
| 17 | CH₃—N—C₁₈H₃₇ | CH₃—N—C₁₈H₃₇ | CH₃—N—C₁₈H₃₇ | CH₃—N—C₁₈H₃₇ | -cyclo-dodecyl | —C₃H₇ |
| 18 | | | | | | |
| 19 | | | | | | |
| 20 | | | | | | |
| 21 | | | | | | |
| 22 | —NH—C₂₂H₄₅ | —NH—C₂₂H₄₅ | —NH—C₂₂H₄₅ | —NH—C₂₂H₄₅ | N-methylpiperazinyl | —C₄H₉ |
| 23 | —N(C₄H₉)—C₁₂H₂₅ | —N(C₄H₉)—C₁₂H₂₅ | —N(C₄H₉)—C₁₂H₂₅ | —N(C₄H₉)—C₁₂H₂₅ | —NH(CH₂)₃OH | —C₄H₉ |
| 24 | —N(C₄H₉)—C₁₂H₂₅ | —N(C₄H₉)—C₁₂H₂₅ | —N(C₄H₉)—C₁₂H₂₅ | —N(C₄H₉)—C₁₂H₂₅ | —NH-bicyclo[3.2.1]octyl | —C₄H₉ |
| 25 | —NH—C₁₈H₃₅ | —NH—C₁₈H₃₅ | —N(CH₃)—C₁₂H₂₅ | —N(CH₃)—C₁₂H₂₅ | piperidinyl | —C₄H₉ |
| 26 | —NH—C₁₈H₃₆(OH) | —NH—C₁₈H₃₆(OH) | piperidinyl | piperidinyl | —NH—phenyl | —C₃H₇ |
| 27 | | | | | | |
| 28 | —N(C₆H₁₃)—C₁₂H₂₅ | —N(C₆H₁₃)—C₁₂H₂₅ | —N(CH₃)—C₆H₁₃ | —N(CH₃)—C₆H₁₃ | piperidinyl | —C₃H |
| 29 | | | | | | |
| 30 | —N(C₆H₁₃)—C₁₂H₂₅ | —N(C₆H₁₃)—C₁₂H₂₅ | —NH—C₁₈H₃₇ | —NH—C₁₈H₃₇ | —NH—(CH₂)₅COOK | —C₃H |
| 31 | | | | | | |
| 32 | | | | | | |
| 33 | | | | | | |
| 34 | —NH—C₁₂H₂₅ | —NH—C₁₂H₂₅ | morpholinyl | morpholinyl | —NH—(CH₂)₂CONH—C₄H₉ | —C₂H₅ |
| 35 | —N(CH₃)—C₆H₁₃ | —N(CH₃)—C₆H₁₃ | —N(CH₃)—C₁₀H₃₇ | —N(CH₃)—C₁₀H₃₇ | —NH adamantyl | —C₂H₅ |

TABLE I—Continued

| Example No. | $Y_1$ | $Y_2$ | $Y_3$ | $Y_4$ | $Y_5$ | R |
|---|---|---|---|---|---|---|
| 36 | | | $-NH-C_{12}H_{25}$ | $-NH-C_{12}H_{25}$ | $-NH-C_{12}H_{25}$ | $-CH=CH_2$ |
| 37 | $-N(CH_3)_2$ | $-NH-CH=CH_2$ | | $-N(CH_3)_2$ | (aziridinyl) | $-CH=CH_2$ |
| 38 | $-NH-i-C_3H_7$ | $-NH-i-C_3H_7$ | $-NH-C_{10}H_{21}$ | $-NH-C_{10}H_{21}$ | $-N(C_2H_5)_2$ | $-CH=CH_2$ |
| 39 | $-N(C_2H_4OH)_2$ | $-N(C_2H_4OH)_2$ | $-NH-C_{16}H_{33}$ | $-NH-C_{16}H_{33}$ | $-NH-C_{16}H_{33}$ | $-CH=CH_2$ |
| 40 | $-N(CH_3)-C_{18}H_{37}$ | $-N(CH_3)-C_{18}H_{37}$ | $-NH-C_{12}H_{25}$ | $-NH-C_{12}H_{25}$ | $-NH-CH_3-COONa$ | $-CH=CH_2$ |
| 41 | $-N(CH_3)-C_{18}H_{37}$ | $-N(CH_3)-C_{18}H_{37}$ | $-NH-C_{12}H_{25}$ | $-NH-C_{12}H_{25}$ | $-NH(CH_2)_3\left[N(CH_2)_2\atop CH_3\right]N(C_2H_5)_2$ | $-CH_3$ |
| 42 | $-NH-(CH_2)_3CON(CH_3)_2$ | $-NH-(CH_2)_3CON(CH_3)_2$ | (morpholinyl) | (morpholinyl) | $-NH-C_{18}H_{37}$ | $-CH_3$ |
| 43 | $-NH-C_4H_9$ | $-NH-C_4H_9$ | $-NH-C_{12}H_{25}$ | $-NH-C_{12}H_{25}$ | $-NH-CH_3-CH=CH-COOK$ | $-CH_3$ |
| 44 | $-NH-C_{12}H_{25}$ | $-NH-C_{12}H_{25}$ | $-N(CH_3)-C_{18}H_{37}$ | $-N(CH_3)-C_{18}H_{37}$ | $-NH-C_{17}H_{33}-COONa$ | $-CH_3$ |
| 45 | $-NH-CH_2-CH_2-CH_2Br$ | $-NH-CH_2-CH_2-CH_2Br$ | $-N(CH_3)-C_{18}H_{37}$ | $-N(CH_3)-C_{18}H_{37}$ | (piperidinyl) | $-CH_2-CH=CH_2$ |
| 46 | $-NH-CH_2-CH_2-CH_2Cl$ | $-NH-CH_2-CH_2-CH_2Cl$ | $-N(CH_3)-C_{18}H_{37}$ | $-N(CH_3)-C_{18}H_{37}$ | (piperidinyl) | $-CH_2-CH=CH_2$ |
| 47 | $-NH-C_{18}H_{37}$ | $-NH-C_{18}H_{37}$ | $-NH-C_{18}H_{37}$ | $-NH-C_{18}H_{37}$ | $\left[\begin{array}{c}CH_3\\NH(CH_2)_2N-(CH_2)_2-\overset{+}{N}(CH_3)_3\end{array}\right]_3Cl^-$ | $-CH_2-CH=CH_2$ |
| 48 | (pyrrolidinyl) | (pyrrolidinyl) | $-NH-C_6H_{13}$ | $-NH-C_6H_{13}$ | $-NH(CH_2)_2N-C_2H_4-$ | $-CH_2-CH=CH_2$ |
| 49 | (aziridinyl) | (aziridinyl) | $-NH-C_{10}H_{21}$ | $-NH-C_{10}H_{21}$ | $-NH-C_{22}H_{45}$ | $-CH_2-CH=CH_2$ |
| 50 | (piperidinyl) | (piperidinyl) | $-NH-C_{12}H_{25}$ | $-NH-C_{12}H_{25}$ | $-NH-C_{10}H_{21}$ | $-C_2H_5$ |
| 51 | (morpholinyl) | (morpholinyl) | $-NH-C_{12}H_{37}$ | $-NH-C_{12}H_{37}$ | $-NH-C_4H_9$ | $-C_2H_5$ |
| 52 | (N-methylpiperazinyl) | (N-methylpiperazinyl) | $-N(CH_3)-C_4H_9$ | $-N(CH_3)-C_4H_9$ | $-N(CH_3)-C_{10}H_{21}$ | $-CH_2-CH=CH_2$ |
| 53 | (anilino) | (anilino) | $-N(CH_3)-C_{10}H_{21}$ | $-N(CH_3)-C_{10}H_{21}$ | $-NH-C_{18}H_{37}$ | $-CH_2-CH=CH_2$ |
| 54 | (piperidinyl) | (piperidinyl) | $-NH-C_{18}H_{37}$ | $-NH-C_{18}H_{37}$ | $-NH-C_{12}H_{25}$ | $-CH_2-CH=CH_2$ |
| 55 | | | | | | |
| 56 | | | | | | |

Table II (Compounds in which $Y_5$ represents the grouping

and in which grouping $Y_1$ and $Y_2$ have the meanings given in the second and third columns below).

| Example No. | $Y_1$ | $Y_2$ | $Y_3$ | $Y_4$ | R |
|---|---|---|---|---|---|
| 57 | $CH_3$–N–$C_{18}H_{37}$ | $CH_3$–N–$C_{18}H_{37}$ | $CH_3$–N–$C_{18}H_{37}$ | (HO–$CH_2CH_2$)$_2$N– | $C_2H_5$ |
| 58 | Same as above | Same as above | Same as above | $CH_3$–N–$C_{18}H_{37}$ | n-$C_3H_7$ |
| 59 | do | do | do | Same as above | n-$C_4H_9$ |
| 60 | do | do | morpholino | morpholino | $C_2H_5$ |
| 61 | do | do | Same as above | Same as above | n-$C_4H_9$ |
| 62 | do | do | (HO–$CH_2CH_2$)$_2$N– | (HO–$CH_2CH_2$)$_2$N– | $C_2H_5$ |
| 63 | do | do | HO–$CH_2CH_2$–N–$CH_2CH_2$–Cl | HO–$CH_2CH_2$–N–$CH_2CH_2$–Cl | n-$C_3H_7$ |
| 64 | –NH-n-$C_{18}H_{37}$ | –NH-n-$C_{18}H_{37}$ | –NH-n-$C_{18}H_{37}$ | –N($C_2H_4OH$)$_2$ | –CH–CH=$CH_2$ |
| 65 | | | | | |
| 66 | –NH-n-$C_{18}H_{37}$ | –NH-n-$C_{18}H_{37}$ | –NH-n-$C_{18}H_{37}$ | aziridinyl | –CH–CH=$CH_2$ |
| 67 | –N-n-$C_{18}H_{37}$ | –NH-n-$C_{18}H_{37}$ | –NH-n-$C_{18}H_{37}$ | pyrrolidinyl | –CH–CH=$CH_2$ |
| 68 | –NH-n-$C_{18}H_{37}$ | –NH-n-$C_{18}H_{37}$ | –NH-n-$C_{18}H_{37}$ | azetidinyl | –CH–CH=$CH_2$ |
| 69 | –NH-n-$C_{18}H_{37}$ | –NH-n-$C_{18}H_{37}$ | –NH-n-$C_{18}H_{37}$ | morpholino | –$C_3H_7$ |
| 70 | –NH-n-$C_{18}H_{37}$ | –NH-n-$C_{18}H_{37}$ | –NH-n-$C_{18}H_{37}$ | 4-methylpiperazinyl | –$C_3H_7$ |
| 71 | | | | | |
| 72 | $CH_3$–N–$C_{18}H_{37}$ | $CH_3$–N–$C_{18}H_{37}$ | $CH_3$–N–$C_{18}H_{37}$ | –N($C_2H_4OH$)$_2$ | –$C_3H_7$ |
| 73 | | | | | |
| 74 | $CH_3$–N–$C_{18}H_{37}$ | $CH_3$–N–$C_{18}H_{37}$ | $CH_3$–N–$C_{18}H_{37}$ | –HN($CH_2$)$_{10}$COONa | –$C_4H_9$ |
| 75 | Same as above | Same as above | Same as above | pyrrolidinyl | –$C_4H_9$ |
| 76 | do | do | do | morpholino | –$C_4H_9$ |
| 77 | do | do | do | 4-methylpiperazinyl | –$C_4H_9$ |
| 78 | do | do | do | -cyclo-dodecyl | –$C_4H_9$ |
| 79 | | | | | |
| 80 | | | | | |
| 81 | | | | | |
| 82 | –NH–$C_{22}H_{45}$ | –NH–$C_{22}H_{45}$ | –NH–$C_{22}H_{45}$ | 4-methylpiperazinyl | –$C_2H_5$ |
| 83 | | | | | |
| 84 | | | | –NH-bicyclo[3.2.1]octyl | –$C_2H_5$ |
| 85 | –NH–$C_{18}H_{35}$ | –NH–$C_{18}H_{35}$ | –N($C_{12}H_{25}$)($CH_3$) | pyrrolidinyl | –$C_2H_5$ |

TABLE II—Continued

| Example No. | Y₁ | Y₂ | Y₃ | Y₄ | R |
|---|---|---|---|---|---|
| 86 | —NH—C₁₈H₃₆(OH) | —NH—C₁₈H₃₆(OH) | —N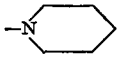 | —NH—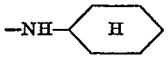H | —C₂H₅ |
| 87 | | | | | |
| 88 | —NH—C₁₂H₂₅ | —NH—C₁₂H₂₅ | —N—C₆H₁₃<br>CH₃ | —N | —C₂H₅ |
| 89 | | | | | |
| 90 | —N—C₁₂H₂₅<br>C₆H₁₃ | —N—C₁₂H₂₅<br>C₆H₁₃ | —NH—C₁₈H₃₇ | —NH—(CH₂)₅COOK | —C₃H₇ |
| 91 | | | | | |
| 92 | | | | | |
| 93 | | | | | |
| 94 | —NH—C₁₂H₂₅ | —NH—C₁₂H₂₅ | —NO | —NH—(CH₂)₅CONH—C₄H₉ | —C₃H₅ |
| 95 | —N—C₆H₁₃<br>CH₃ | —N—C₆H₁₃<br>CH₃ | —N—C₁₈H₃₇<br>CH₃ | —NH adamantyl | —C₃H₅ |
| 96 | | | | | |
| 97 | | | | | |
| 98 | | | | | |
| 99 | —N(C₂H₄OH)₂ | —N(C₂H₄OH)₂ | —NH—C₁₆H₃₃ | —NH—C₁₆H₃₃ | —CH₃ |
| 100 | —N—C₁₈H₃₇<br>CH₃ | —N—C₁₈H₃₇<br>CH₃ | —NH—C₁₂H₂₅ | —NH—CH₂—COONa | —CH₃ |
| 101 | | | | | |
| 102 | —NH—(CH₂)₅CON(CH₃)₂ | —NH—(CH₂)₅CON(CH₃)₂ | —NO | —NH—C₁₈H₃₇ | —CH₃ |
| 103 | | | | | |
| 104 | —NH—C₁₂H₂₅ | —NH—C₁₂H₂₅ | —N—C₁₈H₃₇<br>CH₃ | —NH—C₁₇H₃₃—COONa | —CH₃ |
| 105 | | | | | |
| 106 | | | | | |
| 107 | | | | | |
| 108 | —N | —N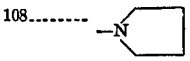 | —NH—C₆H₁₃ | —NH—C₂₂H₄₅ | C₂H₅ |
| 109 | —N | —N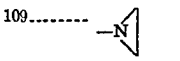 | —NH—C₁₀H₂₁ | —NH—C₁₈H₃₇ | —C₃H₇ |
| 110 | —N | —N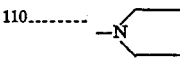 | —NH—C₁₂H₂₅ | —NH—C₁₀H₂₅ | —C₃H₇ |
| 111 | —N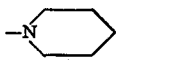O | —N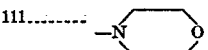O | —NH—C₁₈H₃₇ | —NH—C₈H₁₃ | —C₃H₇ |
| 112 | —N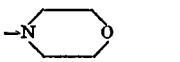N—CH₃ | —N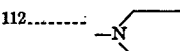N—CH₃ | —NH—C₂₂H₄₅ | —N—C₁₈H₃₇<br>CH₃ | —C₂H₅ |
| 113 | —NH—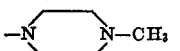 | —NH—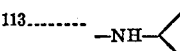 | —N—C₆H₁₃<br>CH₃ | —NH—C₁₈H₃₇ | —C₂H₅ |
| 114 | —N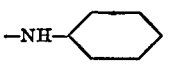 | N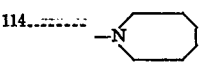 | —N—C₁₀H₂₁<br>CH₃ | —NH—C₁₂H₂₅ | C₂H₅— |
| 115 | | | | | |
| 116 | | | | | |
| 117 | | | | | |

EXAMPLE 118

Emulsion wax (a)

4.250 parts of [2-(1',3'-di-n-octadecyl-guanidino)-4-n-octadecylamino - s - triazinyl - (6)]-[2'',4''-bis-n-octadecyl-amino-s-triazinyl-(6'')]-ethylamine,
4.250 parts of montanic acid alkyl ester wax (M.P.: 80–83°; acid No.: 20–30; saponification No.: 135–150),
4.250 parts of petroleum wax (M.P.: 86–88°; acid No.: 13–16; saponification No.: 45–55; penetration: 4–6 at 100 g./25°/5 sec.),
0.850 part of olein,
0.765 part of the condensation product of oleyl alcohol and ethylene oxide (molar ratio about 1:5), as emulsifier,
0.680 part of aminomethyl propanol,
69.955 parts of water, (b)

2.250 parts of colophonium-modified phenolic resin having a melting point of about 152°, the phenolic resin base of which is produced as described in Example 2 of U.S. Pat. 2,532,374,
0.675 part of concentrated ammonia,
12.075 parts of water.

The components of the mixture (a), with the exception of the water, are melted at 150°, the homogeneous melt is cooled to 100–110° and, while stirring, it is slowly added to the boiling water. The emulsion formed is cooled to room temperature and the mixture (b) is added thereto while stirring.

The resultant emulsion wax is excellently suited for the care of modern floorings, a self-shine which can be afterwards polished being obtained. If this coating obtained on polyvinyl chloride tiles is washed with a moist cloth, then a gloss value of 41.0 is obtained whereas, as a comparison, the gloss value of an emulsion, produced according to the above example in which the wax according to the invention has been replaced by carnauba wax, obtained by washing is only 36.0.

EXAMPLE 119

Liquid floor polish 5.25 parts of N,N-bis-[2-(1',3'-di-n-octadecyl-guanidino)-4-n-octadecylamino-s-triazinyl-(6)]-ethylamine,
0.75 part of vinyl octadecyl ether polymer (M.P.: 49°),
1.50 parts of microwax (M.P.: 74–76°; penetration ASTM 30),
7.50 parts of paraffin (M.P.: 50–52°),
5.00 parts of 1,4-dioxan.
80.00 parts of petroleum fraction (boiling range: 150–180°).

The components are dissolved at 120° and the clear solution is quickly cooled while stirring whereupon a homogeneous, gel-like liquid is formed. This can be used as liquid floor polish and gives a high gloss.

EXAMPLE 120

Automobile polish 1.00 kg. of lightly oxidized microwax having a melting point of 82° C., a penetration of 7 (determined with a penetrometer) and a saponification number of 75/85),
2.00 kg. of N,N-bis-[2-(1',3'-dimethyl-1',3'-di-n-octadecyl-guanidino)-4-di - β - hydroxyethylamino - s - triazinyl-(6)]-ethylamine,
2.00 parts of dimethylpolysiloxane (viscosity: 500 cps. at 20° C.),
1.00 part of sorbitan monolaurate, and
1.00 part of polyoxyethylene-sorbitan monolaurate are dissolved at 100° C.
35.0 kg. of petroleum having a boiling range of from 180–220° C.,
38.00 kg. of boiling water are then added to the hot solution with stirring, the resulting emulsion is cooled with stirring, and then filled into series of aerosol dispenser containers which are then charged with a total of
    4.00 kg. of propane and
    16.00 kg. of butane The resulting product can be sprayed on to an automobile body and yield a glossy protective coating to the lacquer coating on the body.

EXAMPLE 121

Carbon paper 12.00 kg. of gas soot,
6.00 kg. of Milori blue and
26.00 kg. of spindle oil
are intimately mixed together in a dyestuff grinding mill.
42.00 kg. of N,N-bis-[2-(1',3'-dimethyl-1',3'-di-n-octadecyl-guanidino) - 4 - methyl-n-octadecyl-amino - s - triazinyl-(6)]-n-butylamine,
5.00 kg. of wool fat,
1.2 kg. of Victoria Blue B (hydroxide),
0.6 kg. of Methyl Violet and
2.2 kg. of olein
are added with stirring to the mixture which is then heated to 120° C. with further stirring until a homogeneous paste has been obtained. The mixture is then applied with the aid of a heated calender to one side of paper sheet to form a thin layer thereon. A carbon copying paper is thus obtained.

EXAMPLE 122

Floor care composition

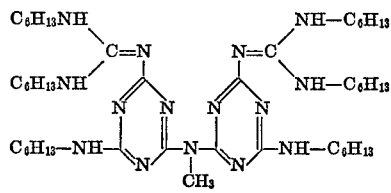

0.75 kg. of vinyloctadecyl ether polymerizate (melting point 49° C.),
1.50 kg. of microcrystalline petroleum wax having a melting point of 74–75° C. and penetration of 30 and
7.50 kg. of paraffin (melting point 50–52° C.)
are dissolved in a mixture of
5.00 kg. of 1,4-dioxane, and
80.00 kg. of petroleum (boiling range 150–180° C.)
in the manner described in Example 3.

The antislip effect of this floor care composoition was tested in comparison with that of a standard floor wax composition which contained in lieu of the 5.25 kg. of triazine a mixture of 2.25 kg. of partially saponified montanic acid ester wax having a melting point of 92–97° C., an acid number of 20–25 and a saponification number of 110–125, and 3.00 kg. of montanic acid ester wax having a melting point of 72–77° C., an acid number of 6–10 and a saponification number of 95–105.

Antislip friction was measured with the aid of a measuring body having a friction surface covered with filter paper, and with a dynamometer (0.30 g.).

A piece of linoleum floor treated with the standard floor wax showed an average antislip friction of 20 g., while the same kind of linoleum treated under exactly the same conditions with the same amount of the composition of Example 122 showed a higher antislip friction, namely of 24 g.

EXAMPLE 123

Floor care composition

Example 122 was repeated, but in lieu of the triazine used therein, the same amount of the triazine of the formula

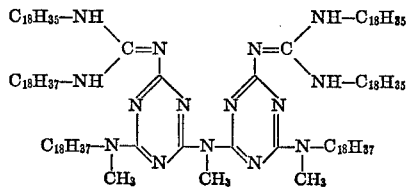

is employed.

A piece of linoleum treated with the standard floor wax described in Example 122 showed an average slip-preventing friction value of 16 g.

In contrast thereto, the floor care composition of Example 123, tested at the same time under the same atmospheric conditions showed an average friction value of 25 g.

The results obtained with the method of determination described in Example 122 are influenced by the ambient temperature and the humidity of the surrounding atmosphere; each comparative test must therefore be carried out simultaneously with the test sample and the control sample.

In Examples 119, 121, 122 and 123, the paraffin or microwax component can be replaced by:

cellulose acetobutyrate (a)
cellulose acetoisobutyrate (a')

polyvinyl acetal (b)
cellulose dinitrate
hydroxypropyl cellulose (c)
ethyl cellulose (d)
polyvinyl butyral (e)
modified phenoplastic resin (f)
modified aminoplastic resin (g) (g')
polyurethane containing 65% safflower oil (h)
polyurethane containing 65% of linseed oil (h')
melamine resin (i)
unmodified urea-formaldehyde resin (j)
styrene/maleic anhydride copolymer (k)
silicone resin (l)

In examples 118 and 120 the montanic ester wax or microwax component can be replaced by:

poly-(methyl methacrylate) (m)
poly-(isobutyl methacrylate) (n)
poly-(propyl methacrylate) (o)
Colophony Grade WW
cyclohexanone/formaldehyde resin (p)
phenol-terpen resin (q)
poly-(butyl methacrylate) (r) (s)
phthalic resin (t)
phenol resin (u)
phenol-formaldehyde resin, unmodified (v)

Plasticizers that may be added to the above wax substitutes, are, for example:

Liquid plasticizers

D-1 Methyl abietate
D-2 Colophonium diethylene glycol soft resins (w) (x)
D-3 sucrose acetobutyrate (y)
  sucrose acetoisobutyrate (z)
D-4 diocetyl sebacate decyl oleate
D-5 didecyl phthalate
D-6 dimethylcyclohexyl phthalate
D-7 cis-9-octadecen-1-ol
D-8 trioctyl phosphate
D-9 polypropylene glycol (aa)
D-10 glycerol monooleate, glycerol dioleate, refined castor oil
D-11 non-drying unmodified alkyl resin (ab)
D-12 non-drying alkyd resin (ac)
  alkyd resins modified (ad) (ae)
D-13 chlorinated diphenyl 48% Cl
D-14 carbamic soft resin (af)
D-15 2-chloro-4,6-bis-(diethylamino)-s-triazine.

Solid plasticizers

E-1 octyl laurate
E-2 hydrogenated castor oil M.P. 85.5° C.
  refined copra M.P. 26° C.
E-3 fully hydrogenated copra
  lauric acid
  fatty acids
E-4 adipic acid
E-5 hexyl-dodecanol, octyldodecanol, lauryl alcohol
  cetyl alcohol, myristyl alcohol
E-6 monostearyl amine
E-7 polyvinyl stearate (ag)
E-8 lecithine
E-9 polyethylene (Mol. w. ca. 1500)
E-10 2,2,4-trimethylpentane-1,3-diol
  2,2-dihydroxymethyl-butan-1-ol
E-11 dicyclohexyl phthalate
E-12 ditetradecyl phthalate
  butyrate of 1,4-butanediol
  glycerol monolaurate

EXAMPLE 124

Floor-care composition 40 kg. of N,N-bis-{2-[1',3'-di-(n-octadecyl)guanidino]-4 - (n-octadecylamino)-s-triazinyl-(6)}-ethylamine were slowly dissolved with continuous stirring in 60 kg. of Toluol, at a temperature of about 50°. A gel was thus obtained which was further diluted to a 10% solution.

The antislip effect of this floor-care composition was tested on a piece of wooden floor previously treated with the same standard floor wax composition as that described hereinbefore, and then polished 20 times with a soft cloth after two hours wait. This piece of wooden floor was then treated with the above guanidine-triazine wax composition and again polished 20 times with a soft cloth after two hours wait. Antislip friction of the polished pieces of wood before and after application of the guanidine triazine was then measured with the aid of a measuring body having a surface covered with filter paper and with a dynamometer (0–30 g.). An average increase of antislip friction of 20% was shown by the piece of wooden floor which had been aftertreated with the guanidino-triazine solution over that of the piece of floor treated only with the standard floor-wax composition.

EXAMPLE 125

A floor-care composition was prepared by slowly dissolving 40 kg. of N-{2-[1',3'-di-(n-octadecyl)-guanidino]-4 - (n-octadecylamino)-s-triazinyl - (6")}-N-[2"',4"'-bis-(n-octadecylamino)-s-triazinyl - (6")]-ethylamine, with stirring at a temperature of about 60° in 60 kg. of Shell Sol T, a solvent consisting of aliphatic hydrocarbons and having a boiling range of 184–207°.

A solution was thus obtained which was further diluted to a 10% solution.

The latter solution applied to a wood floor previously polished with a standard wax, in the manner described in detail in the preceding example, showed a similar improvement of antislip friction.

DETAILS CONCERNING THE SUBSTANCES EMPLOYED IN THE PRECEDING EXAMPLES (a) Cellulose acetobutyrate having a repetitive unit of the formula

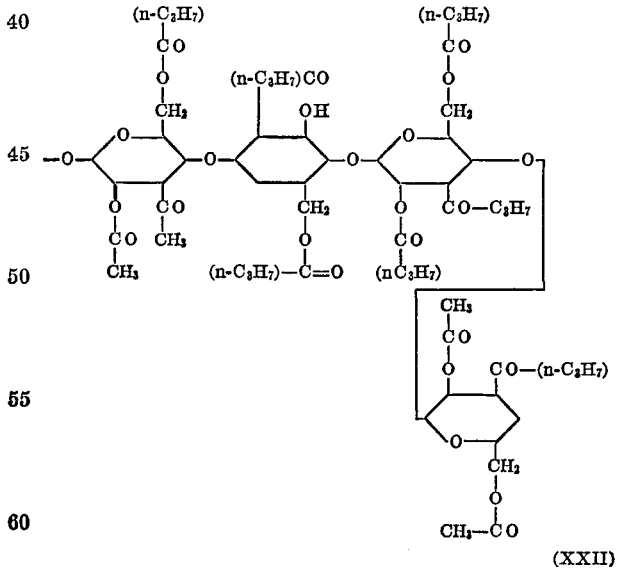

(XXII)

and which is soluble in ethanol and has a viscosity of 0.3 second measured according to ASTM D-1343–54 T with a solution according to D-871–54 T.

(a') Cellulose acetoisobutyrate having a repetitive unit of a formula similar to Formula XXII, but in which the groups —O—CO—CH—CH$_2$—CH$_3$ are replaced by the groups

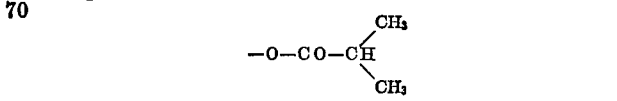

(b) Polyvinyl acetal.—Melting Point: 100°±5° C. determined according to Krämer-Sarnow); viscosity: 40±2 centipoises (determined with a 20% solution, calculated on the total weight of the latter, in a mixture of ethanol and ethyl acetate in a weight ratio of 85:15 as solvent).

(c) Hydroxypropyl cellulose.—An aqueous solution having a concentration of 5% by weight and having a viscosity at 25° C. of 25 to 150 centipoises (measured according to Brookfield).

(d) Ethyl cellulose.—Viscosity of 8 to 11 centipoises in a 5% by weight solution of a toluene/ethanol mixture in a weight ratio of 80:20 at 25° C.

(e) Polyvinyl butyral.—Viscosity at 20° C. in a 5% ethanol solution (prepared at 95° C.): 10 centipoises; acidity, calculated as acetic acid, less than 0.05%; content of polyvinyl alcohol about 20%; content of polyvinyl acetate about 3%.

(f) Modified phenoplastic resin.—Melting range, 55 to 60° C.; acid number, 80 to 95; soluble in alcohols, glycol ethers, ketones and esters, slightly soluble in aliphatic hydrocarbons.

(g) Modified aminoplastic resin.—Type: modified urea-formaldehyde resin; coloration index, 2 (DIN 53,403); acid number, 6 maximum (DIN 53,402); viscosity (Höppler viscosity at 20° C.) in a 60% isobutanol solution: 8 to 10 poises.

(g') Modified aminoplastic resin.—Type: modified melamine-formaldehyde resin; coloration index, 0 to 1; acid number, about 0.5; viscosity in a 55% isobutanol solution: about 200 seconds (cup DIN 4 at 20° C.); soluble in any proportion in the following solvents: ethanol, isopropanol, butanol, ethylene glycol.

(h) Polyurethane containing 65% of safflower oil.—Acid number, less than 0.5; hydroxyl number, maximum 6; not containing any free isocyanate groups; viscosity at 20° C. about 5,000 centipoises; density at 20° C. 0.930.

(h') Polyurethane containing 65% of linseed oil.— Acid number, 0.5; hydroxyl number, 6 mg. KOH per gram; not containing any free isocyanate groups.

(i) Melamine resin.—Melamine/formaldehyde condensation product; melting point, 62.5° C.; Sward hardness, 58. The product is soluble at a rate of 25% by weight in ethanol.

(j) Unmodified urea-formaldehyde resin.—Acid number, 1; viscosity in a 60% isobutanol solution (cup DIN 4, at 20° C.) about 500 seconds.

(k) Styrene/maleic anhydride copolymer.—Molecular weight, about 1,900; melting range, 135 to 150° C.; acid number, 220; viscosity in a 10% acetone solution at 30° C., 0.76 centistoke.

(l) Silicone resin.—Melting point, 88° C.; soluble in isopropanol; silicone/ethylene glycol copolymer.

(m) Poly-(methyl-methacrylate).—Density, 1.09 at 25° C.; viscosity temperature, 63°±2° C.,; acid number, about 7.

(n) Poly-(isobutyl-methacrylate).—Tukon hardness, about 8; specific weight, 1.10 at 20° C.; viscosity at 20° C. in a 40% solution of:

benzene: 2,000 cps.
toluene: 570 cps.
xylene: 975 cps.
methyl isobutyl ketone 1425 cps.

(o) Poly - (propyl-methacrylate).—Tukon hardness, 7 to 8; density; 1.07 at 25° C.; viscidity temperature, 40°±2° C.; acid number, less than 10; viscosity in a 40% isopropanol solution, 8000 centipoises.

(p) Cyclohexanone/formaldehyde resin (ketonic resin).—Acid number, less than 1; softening range, 105–115° C.

(q) Phenol-terpene resin.—Melting range, 117–130° C.; acid number, 60–70; viscosity, 20–30 centipoises in a 50% by weight toluene solution at 20° C.

(r) Poly - (butyl - methacrylate.)—Tukon hardness, about 12; viscidity temperature, 77° C.; copolymer of methacrylic acid with butanol and isobutanol.

(s) Poly-(butyl-methacrylate).—Tukon hardness, 12; specific weight at 25° C., 1.11; viscidity temperature, 57° C.±2° C.; Brookfield viscosity at 25° C. in a 40% isopropanol solution, 2,400 centipoises.

(t) Phthalic resin, pure.—Melting point, 98° C.; acid number, 180 to 200.

(u) Pure phenol resin.—Melting range, 75 to 83° C. (capillary method); acid number, 0; soluble in any proportion in alcohols and glycol ethers.

(v) Unmodified phenol-formaldehyde resin.—Melting point, 79° C. (capillary method); acid number, 0; soluble in any proportion in alcohols and glycol ethers, insoluble in aliphatic and aromatic hydrocarbons.

(w) Rosin/diethylene glycol soft resin.—Acid number, less than 10; saponification number, about 15; iodine number, 140; refractive index, 1.525 ($n_D^{20°}$); Höppler viscosity at 20° C. about 200 poises; specific weight at 20° C., 1.07 to 1.08 g./cm.$^3$.

(x) Soft resin from natural resinic acids condensed with diethylene glycol.—Acid number, 2 to 3; coloration index in a 50% acetone solution 1 to 2; density, 1.06 to 1.07 g./ml. at 20° C.; hydroxyl number, 120 to 145.

(y) Sucrose acetobutyrate of the formula

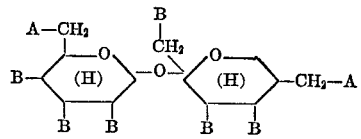

(XXIII)

wherein

A represents the group —O—CO—CH$_3$,
B represents the group —O—CO—(CH)$_2$—CH$_3$ and
(H) represents a saturated ring.

(z) Sucrose acetoisobutyrate of the Formula XXIII wherein A has the same meaning and B represents the group

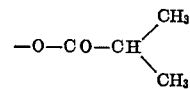

(aa) Polyglycol P 2000.—Molecular weight, about 2000; density, 1.002 at 20° C.; refractive index, 1.450 at 25° C.; pour point 0° C.; flash point 445° F.; fire point 510° F.; viscosity, 1880 centistokes at 0° C.

(ab) Unmodified non-drying alkyd resin.—acid number, <20; viscosity in a 50% butyl acetate solution, about 25 seconds (about 100 cp.) (cup DIN 4–20° C.); soluble in any proportion in glycol ethers.

(ac) Non-drying modified alkyd resin containing 33% of phthalic anhydride and 42% of coconut oil.

(ad) Non-drying alkyd resin modified by fatty acids containing 31% of phthalic anhydride and 23% of fatty acids, having an acid number of 12–18 and a hydroxyl number of about 140.

(ae) Non-drying alkyd resin modified by ricinus oil.—Content of phthalic anhydride, 32%; content of oil, 54%; acid number, <20; viscosity in a 50% xylene solution (cup DIN 4–20° C.) 130 to 170 seconds=550 to 770 centipoises; soluble in any proportion is glycol ethers and alcohols, insoluble in aliphatic hydrocarbons.

(af) Carbamic soft resin.—Density at 20° C. 1.1; flash point, 180–200° C. (with decomposition); viscosity (at 20° C.); 130 poises.

(ag) Polyvinyl stearate.—Melting point, 48–50° C.; penetration index, 1 to 2; density, 0.93 to 0.94 at 20° C.; viscosity 400 centistokes at 70° C. and 200 centistokes at 100° C. (according to Ubbelohde); acid number, less than 1; saponification number, 0; ash, 0; non-saponifiable, 100%.

What is claimed is:

1. A compound of the formula

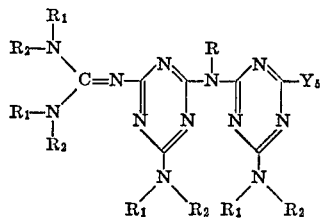

wherein $R_1$ is alkyl of from 16 to 18 carbon atoms or 9-octadecenyl; $R_2$ is hydrogen or methyl; or, in one or two of the groups

both $R_1$ and $R_2$ are β-hydroxyethyl; $Y_5$ is the group

or the group

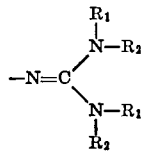

and R is alkyl of from 1 to 4 carbon atoms or allyl.

2. A compound as defined in claim 1 which is [2-(1',3'-di - n - octadecyl-guanidine)-4-n-octadecylamino-s-triazinyl - (6)]-[2'',4'' - bis-n-octadecylamino-s-triazinyl-(6'')]-ethylamine.

3. A compound as defined in claim 1 which is N,N-bis-[2 - (1',3'-di-n-octadecyl-guanidino)-4-n-octadecylamino-s-triazinyl-(6)]-ethylamine.

4. A compound as defined in claim 1 which is guanidino - s - triazine is N-[2-(1'',3''-dimethyl-1'',3''-di-n-octadecyl - guanidino)-4-methyl-n-octadecylamino-s-triazinyl-(6)]-N-[2'-(1''',3'''-dimethyl - 1''',3''' - di-n-octadecyl-guanidino) - 4' - (di-β-hydroxyethylamino)-s-triazinyl-(6')]-ethylamine.

5. A compound as defined in claim 1 which is guanidino-s-triazine is N,N-bis-[2 - (1',3'-dimethyl-1',3'-di-n-octadecyl-guanidino) - 4 - methyl-n-octadecylamino-s-triazinyl-(6)]-n-propylamine.

6. A compound as defined in claim 1 which is guanidino-s-triazine is N,N-bis-[2 - (1',3'-dimethyl-1',3'-di-n-octadecyl-guanidino) - 4 - methyl-n-octadecylamino-s-triazinyl-(6)]-n-butylamine.

7. A compound as defined in claim 1 which is guanidino-s-triazine is N,N-bis-[2 - (1',3'-dimethyl-1',3'-di-n-octadecyl-guanidino) - 4 - di-β-hydroxyethylamino-s-triazinyl-(6)]-ethylamine.

8. A compound as defined in claim 1 which is N,N-bis-[2-(1',3'-di-n-9-octadecenyl-guanidino) - 4 - (methyl-n-octadecylamino)-s-triazinyl-(6)]-methylamine.

No references cited.

ALEX MAZEL, Primary Examiner

J. TOVAR, Assistant Examiner

U.S. Cl. X.R.

106—3; 260—243 B, 246 B, 247.2 A, 247.5